(12) United States Patent
Zhao et al.

(10) Patent No.: US 10,773,597 B2
(45) Date of Patent: Sep. 15, 2020

(54) AUTONOMOUS VEHICLE ACCELERATION PROFILE

(71) Applicant: Ford Global Technologies, LLC, Dearborn, MI (US)

(72) Inventors: Yanan Zhao, Ann Arbor, MI (US); Chen Zhang, Canton, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 244 days.

(21) Appl. No.: 15/726,994

(22) Filed: Oct. 6, 2017

(65) Prior Publication Data

US 2019/0106014 A1   Apr. 11, 2019

(51) Int. Cl.
  *B60L 15/20*  (2006.01)
  *B60L 58/12*  (2019.01)
  (Continued)

(52) U.S. Cl.
  CPC ........... *B60L 15/20* (2013.01); *B60L 15/2045* (2013.01); *B60L 58/12* (2019.02); *B60W 20/12* (2016.01); *G01C 21/3469* (2013.01); *G05D 1/0088* (2013.01); *B60L 2240/14* (2013.01); *B60L 2240/421* (2013.01); *B60L 2240/423* (2013.01); *B60L 2260/32* (2013.01); *B60W 2720/103* (2013.01); *F02D 2200/501* (2013.01); *G05D 2201/0213* (2013.01)

(58) Field of Classification Search
  None
  See application file for complete search history.

(56) References Cited

U.S. PATENT DOCUMENTS 9,150,222 B2 * 10/2015 Papajewski ......... B60W 40/105
9,387,861 B1    7/2016 Lurie et al.
(Continued)

FOREIGN PATENT DOCUMENTS

CN    105599639 A    5/2016
CN    104608771 B    2/2017
(Continued)

OTHER PUBLICATIONS

Winter et al. article entitled "Experimental Investigation of Online Path Planning for Electric Vehicles," 2016 IEEE 9th International Conference on Intelligent Transportation Systems (ITSC) Windsor Oceanico Hotel, Rio de Janeiro, Brazil, Nov. 1-4, 2016.

*Primary Examiner* — Jelani A Smith
*Assistant Examiner* — Alexander C. Bost
(74) *Attorney, Agent, or Firm* — Frank A. MacKenzie; Bejin Bieneman PLC

(57) ABSTRACT

An autonomous vehicle controller includes a memory and a processor programmed to execute instructions stored in the memory. The instructions include determining a plurality of energy cost functions. Each energy cost function is associated with a combination of candidate variables. The instructions further include selecting one of the plurality of energy cost functions as a minimum energy cost function, determining a combination of candidate variables associated with the minimum energy cost function, and controlling acceleration of a host vehicle according to the combination of candidate variables associated with the minimum energy cost function.

14 Claims, 3 Drawing Sheets

(51) Int. Cl.
*B60W 20/12* (2016.01)
*G01C 21/34* (2006.01)
*G05D 1/00* (2006.01)

(56) References Cited

U.S. PATENT DOCUMENTS

| | | | |
|---|---|---|---|
| 2009/0118948 A1* | 5/2009 | Heap | B60K 6/445 |
| | | | 701/55 |
| 2010/0262408 A1* | 10/2010 | Taguchi | B60W 50/0098 |
| | | | 703/8 |
| 2012/0010767 A1* | 1/2012 | Phillips | G01C 21/3469 |
| | | | 701/22 |
| 2015/0046132 A1* | 2/2015 | Papajewski | B60W 40/107 |
| | | | 703/2 |
| 2016/0159360 A1 | 6/2016 | Miller et al. | |
| 2017/0030728 A1* | 2/2017 | Baglino | G01C 21/3469 |
| 2017/0088117 A1* | 3/2017 | Ogawa | B60L 58/13 |
| 2018/0056978 A1* | 3/2018 | Hata | B60W 20/17 |
| 2018/0134296 A1* | 5/2018 | Oh | B60W 30/143 |
| 2018/0143035 A1* | 5/2018 | Ricci | B62D 15/00 |
| 2018/0162397 A1* | 6/2018 | Eo | B60W 20/15 |
| 2018/0170382 A1* | 6/2018 | Soliman | B60L 58/13 |
| 2019/0004526 A1* | 1/2019 | Soliman | G05D 1/0217 |
| 2019/0016329 A1* | 1/2019 | Park | B60L 15/2045 |

FOREIGN PATENT DOCUMENTS

| | | |
|---|---|---|
| CN | 104827931 B | 2/2017 |
| DE | 20201300611 U1 | 11/2014 |
| EP | 2945140 A1 | 11/2015 |

\* cited by examiner

AUTONOMOUS VEHICLE ACCELERATION PROFILE

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
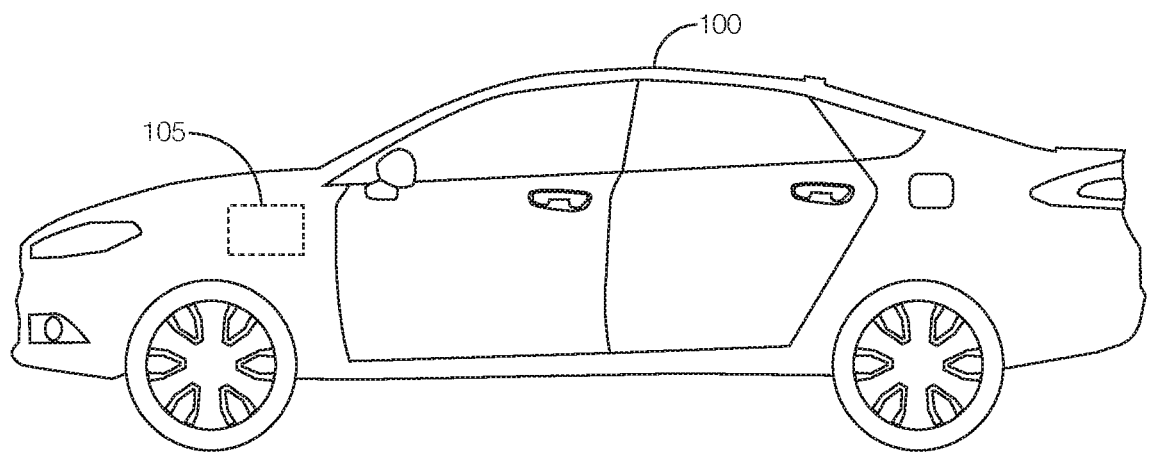
FIG. 1 illustrates an example autonomous host vehicle with an autonomous vehicle controller that controls acceleration of the host vehicle according to an optimized acceleration profile.

An autonomous vehicle is controlled by an autonomous vehicle controller, which is sometimes referred to as a "virtual driver." The control of the autonomous vehicle may be designed to mimic that of a human driver. That is, the virtual driver may accelerate and decelerate the autonomous vehicle in a way that feels (to a human passenger) like the autonomous vehicle is driven by a human. One benefit of doing so is that the familiarity of how the autonomous vehicle is operated may make the human passenger feel more comfortable.

Rather than simply mimic a human driver, the virtual driver may be programmed to apply an optimized acceleration profile. The optimized acceleration profile may use less battery power than an acceleration profile that mimics human operation of the autonomous vehicle, which can improve the range of, e.g., battery electric vehicles, hybrid vehicles, etc. Developing the optimized acceleration profile can be difficult given the number of variables involved during the real-time operation of the autonomous vehicle.

One way to control the autonomous vehicle to develop according to the optimized acceleration profile is with an autonomous mode controller that includes a memory and a processor programmed to execute instructions stored in the memory. The instructions include determining a plurality of energy cost functions, each associated with a combination of candidate variables, selecting one of the plurality of energy cost functions as a minimum energy cost function, determining a combination of candidate variables associated with the minimum energy cost function, and controlling acceleration of a host vehicle according to the combination of candidate variables associated with the minimum energy cost function.

Determining the plurality of energy cost functions may include determining a total energy cost for each combination of candidate variables. Determining the total energy cost for each combination of candidate variables may include determining a total energy cost for a first combination of candidate variables. Determining the total energy cost for the first combination of candidate variables may include calculating a battery discharge power. Calculating the battery discharge power may include calculating the battery discharge power based at least in part on an instant total power, an electric motor efficiency, and a propulsion battery efficiency. In that instance, the processor may be programmed to calculate the electric motor efficiency based at least in part on a motor speed and a motor torque. Further, the processor may be programmed to calculate the motor speed as a function of an instant vehicle speed, and the processor may also be programmed to calculate the motor torque as a function of the instant total power. In some instances, the processor may be programmed to calculate the propulsion battery efficiency based at least in part on a state of charge of a propulsion battery and the instant total power.

In some instances, the processor may be programmed to calculate the instant total power based at least in part on an estimated driver demand and an estimated accessory power.

In some possible approaches, each combination of candidate variables defines one of a plurality of acceleration profiles. In that case, the processor may be programmed to select the combination of candidate variables associated with the minimum energy cost function as an optimized acceleration profile. In that implementation, controlling acceleration of the host vehicle according to the combination of candidate variables associated with the minimum energy cost function may include controlling acceleration of the host vehicle according to the optimized acceleration profile.

An example method includes determining a plurality of energy cost functions, each associated with a combination of candidate variables; selecting one of the plurality of energy cost functions as a minimum energy cost function; determining a combination of candidate variables associated with the minimum energy cost function; and controlling acceleration of a host vehicle according to the combination of candidate variables associated with the minimum energy cost function.

Determining the plurality of energy cost functions may include determining a total energy cost for each combination of candidate variables. Determining the total energy cost for each combination of candidate variables may include determining a total energy cost for a first combination of candidate variables. Determining the total energy cost for the first combination of candidate variables may include calculating a battery discharge power based at least in part on an instant total power, an electric motor efficiency, and a propulsion battery efficiency. The electric motor efficiency may be calculated based at least in part on a motor speed and a motor torque. The motor speed may be a function of an instant vehicle speed and the motor torque may be a function of the instant total power.

In some possible approaches, the propulsion battery efficiency may be calculated based at least in part on a state of charge of a propulsion battery and the instant total power.

In some possible approaches, the instant total power may be calculated based at least in part on an estimated driver demand and an estimated accessory power.

In some possible approaches, each combination of candidate variables defines one of a plurality of acceleration profiles and determining a combination of candidate variables associated with the minimum energy cost function includes selecting the combination of candidate variables associated with the minimum energy cost function as an optimized acceleration profile. In that instance, controlling acceleration of the host vehicle according to the combination of candidate variables associated with the minimum energy cost function includes controlling acceleration of the host vehicle according to the optimized acceleration profile.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, an autonomous host vehicle 100 has an autonomous vehicle controller 105 that controls the autonomous operation of the host vehicle 100. As discussed in greater detail below, the autonomous vehicle controller 105 accelerates the host vehicle 100 according to an optimized acceleration profile. To generate the optimized acceleration profile, the autonomous vehicle controller 105 determines multiple acceleration profiles based on various factors including the maximum amount of acceleration, the amount of time spent accelerating, etc. The acceleration profile that would use the least amount of battery power may be referred to as the optimized acceleration profile. The autonomous vehicle controller 105 may apply the optimized acceleration profile to accelerate the host vehicle 100.

Although illustrated as a sedan, the host vehicle 100 may include any passenger or commercial automobile such as a car, a truck, a sport utility vehicle, a crossover vehicle, a van, a minivan, a taxi, a bus, etc. As discussed in greater detail below, the host vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking under certain circumstances without human interaction. The partially autonomous mode may further refer to the SAE Level 3 mode of operation where the host vehicle 100 can handle steering, acceleration, and braking under certain circumstances, as well as monitoring of the driving environment, even though some human interaction is sometimes needed. Further, the host vehicle 100 is a battery electric vehicle.

Figure 2:
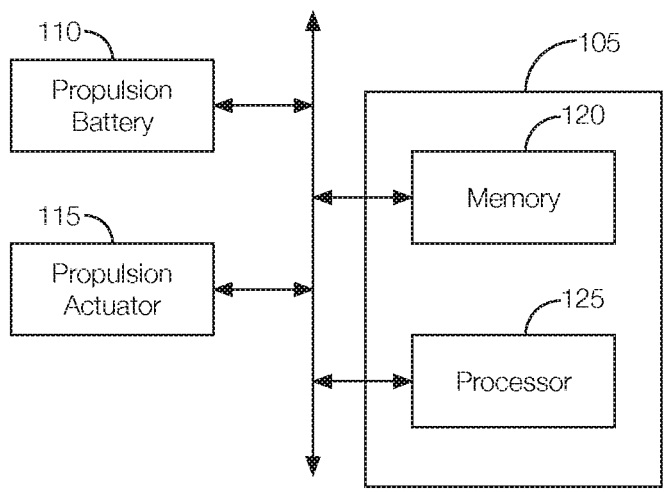
FIG. 2 is a block diagram showing example components of the host vehicle.

Referring now to FIG. 2, components of the host vehicle 100 include a propulsion battery 110, a propulsion actuator 115, and the autonomous vehicle controller 105. Components of the autonomous vehicle controller 105 include a memory 120 and a processor 125.

The propulsion battery 110 is a battery in the host vehicle 100 that is used to provide energy that propels the host vehicle 100. The propulsion battery 110, which may be referred to as an electric vehicle battery (EVB) or a traction battery, provides electrical energy that is applied to an electric motor that drives the wheels of the host vehicle 100. That is, the electric energy from the propulsion battery 110 causes the electric motor to rotate a shaft, which in turn causes the wheels of the host vehicle 100 to rotate.

The propulsion actuator 115 is controlled by control signals output by the processor 125. Electrical control signals output by the processor 125 may be converted into mechanical motion by the propulsion actuator 115. The propulsion actuator 115 may be implemented via, e.g., a linear actuator, a servo motor, an electric motor, or the like. The propulsion actuator 115 may be implemented by an electric motor that rotates a motor shaft. The rotation of the motor shaft may act on the vehicle wheels though, e.g., an axle, a gearbox, or possibly other vehicle components. The propulsion actuator 115 may rotate the motor shaft, in accordance with signals output by the processor 125, to effectuate the optimized acceleration profile.

The memory 120 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 120 may store instructions executable by the processor 125 and data such as constraints associated with variables used in developing acceleration profiles, including the optimized acceleration profile. The instructions and data stored in the memory 120 may be accessible to the processor 125 and possibly other components of the host vehicle 100.

The processor 125 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 125 is programmed to control various autonomous vehicle operations, including controlling acceleration of the host vehicle 100. That is, the processor 125 may be programmed to accelerate the host vehicle 100 according to the optimized acceleration profile. To generate the optimized acceleration profile, the processor 125 may be programmed to determine multiple acceleration profiles based on various factors including the maximum amount of acceleration, the amount of time spent accelerating, etc. The acceleration profile that would use the least amount of battery power may be referred to as the optimized acceleration profile. The processor 125 may be programmed to select and apply the optimized acceleration profile to accelerate the host vehicle 100.

Figure 3:
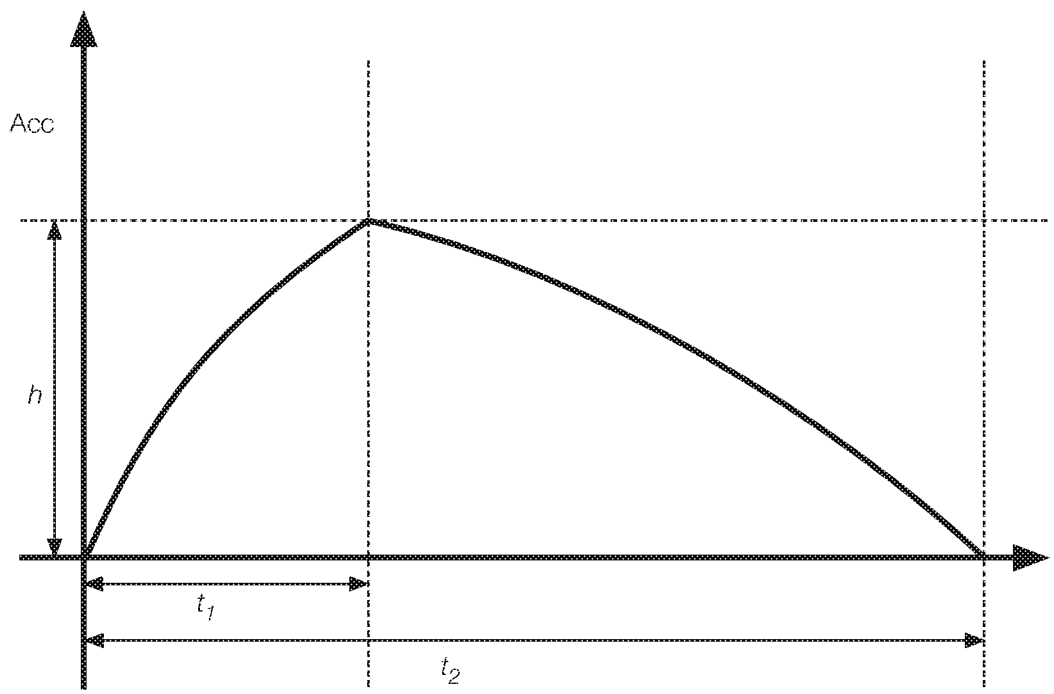
FIG. 3 illustrates an example acceleration profile, such as an example optimized acceleration profile.

FIG. 3 illustrates a graph of an example acceleration profile that may be developed by the processor 125. The X-axis represents time and the Y-axis represents acceleration. The acceleration profile is separated into time periods, a first time period (from time 0 to $t_1$) and a second time period (from time $t_1$ to $t_2$). During the first time period, the acceleration of the host vehicle 100 increases, and the change in the increase in the acceleration is represented by a first parabolic curve. During the second time period, the acceleration of the host vehicle 100 continues but gradually drops to zero. The time $t_2$ occurs when the acceleration of the host vehicle 100 is zero. The acceleration during the second time period is also represented by a parabolic curve different than the parabolic curve of the first time period. The maximum acceleration is shown by the value h.

The parabolic curve for the first time period may be defined as shown in Equation (1).

$$Acc = a_1 t^2 + b_1 t, t \in [0, t_1] \quad (1)$$

The parabolic curve for the second time period may be defined as shown in Equation (2).

$$Acc = a_2(t-t_1)^2 + b_2(t-t_1) + h, t \in [t_1, t_2] \quad (2)$$

In these equations, acceleration is zero at time zero (e.g., t is equal to 0) and again at time $t_2$ (e.g., when t is equal to $t_2$). Further, in these equations, the acceleration is equal to the maximum acceleration h at time t1 (e.g., when t is equal to $t_1$).

The acceleration may also be constrained according to Equations (3)-(6).

$$\int_0^{t_2} Acc(t)\,dt = V_{target} \quad (3)$$

$$Ave(Acc(t)) = \frac{V_{target}}{t_2} \leq Acc_{max}, t_2 \geq \frac{V_{target}}{Acc_{max}} \quad (4)$$

$$Ave(Acc(t)) = \frac{V_{target}}{t_2} \geq Acc_{min}, t_2 \leq \frac{V_{target}}{Acc_{min}} \quad (5)$$

$$\max(Acc(t)) \leq Acc_{peak} \quad (6)$$

In Equations (3)-(6), $V_{target}$ is the target vehicle speed to be reached after acceleration, $Acc_{min}$ and $Acc_{max}$ are the minimum and maximum average acceleration, respectively, during the first and second time periods (e.g., when time t is between 0 and $t_2$) given the distance of the host vehicle 100 from its surroundings and further accounting for driver comfort, and $Acc_{peak}$ is the peak acceleration that the powertrain of the host vehicle 100 can provide. The processor already know certain values, such as $V_{target}$, $Acc_{min}$, $Acc_{max}$, and $Acc_{peak}$. In other words, those values may be beyond the control of the processor 125 in determining possible acceleration profiles. Even still, the processor 125 may determine those values from signals output by, e.g., other vehicle components, during real-time path planning, as discussed in greater detail below. Some values may be predetermined and stored in the memory 120. The degrees of freedom (i.e., the variables the processor 125 can control) may be $t_1$, h, $a_1$, and $t_2$ although $t_2$ is subject to a range and h is limited by $Acc_{peak}$.

The processor 125 is programmed to find a set of values for $a_1$, $t_1$, $t_2$, and h that minimize the energy cost during the first and second time periods (from time 0 to $t_2$), as shown in Equation (7).

$$(a_1, t_1, t_2, h) = \min(E_{batt}|_0^{t_2}) \quad (7)$$

For battery electric vehicles, the energy cost is the total battery energy consumed during the first and second time periods to have the acceleration of the host vehicle 100 follow the acceleration profile. The optimized acceleration profile is developed based on the combination of values for $a_1$, $t_1$, $t_2$, and h that minimize the energy cost during the first and second time periods.

To develop the optimized acceleration profile, the processor 125 may be programmed to obtain the target vehicle speed after the acceleration of the host vehicle 100. The processor 125 may be further programmed to determine the average acceleration range of the host vehicle 100 while accelerating to the target vehicle speed. The average acceleration range may be a function of a safe distance of the host vehicle 100 relative to its surroundings and driver comfort. The processor 125 may be further programmed to determine the peak acceleration which may be based on the powertrain capabilities of the host vehicle 100. The processor 125 may be programmed to determine the target vehicle speed, average acceleration range, and peak acceleration from, e.g., lookup tables or other data stores stored in the memory 120. In some possible implementations, any one or more of the values for the target vehicle speed, average acceleration range, and peak acceleration may be based on real-time path planning based on a driving scenario or vehicle configuration. For instance, one or more of those values may be a function of traffic conditions, vehicle surroundings, destination of the trip, etc. The processor 125 may be further programmed to define ranges of the variables $a_1$, $t_1$, $t_2$, and h. The values of those variables that minimize the energy cost ($E_{batt}$) may be determined by the processor 125 solving the optimization problem via different optimization approaches such as exhaustive search, genetic algorithm, or the like. Moreover, the processor 125 may be programmed to develop the optimized acceleration profile (i.e., the acceleration profile with the lowest energy cost) based on the optimized values for $a_1$, $t_1$, $t_2$, and h.

Developing the optimized acceleration profile may include estimating the energy cost for each candidate ($a_1$, $t_1$, $t_2$, and h) and its associated total power to meet driver demand and accessory need, given the target vehicle speed. By considering electric motor efficiency and battery efficiency to deliver the total power, the processor 125 may be programmed to determine the battery power used at each instant in time. The total battery energy consumed is the sum of the battery power used at each instant in time. Thus, the processor 125 may calculate the total battery energy usage for many different acceleration profiles, and select the profile with the lowest battery energy usage as the optimized acceleration profile.

Figure 4:
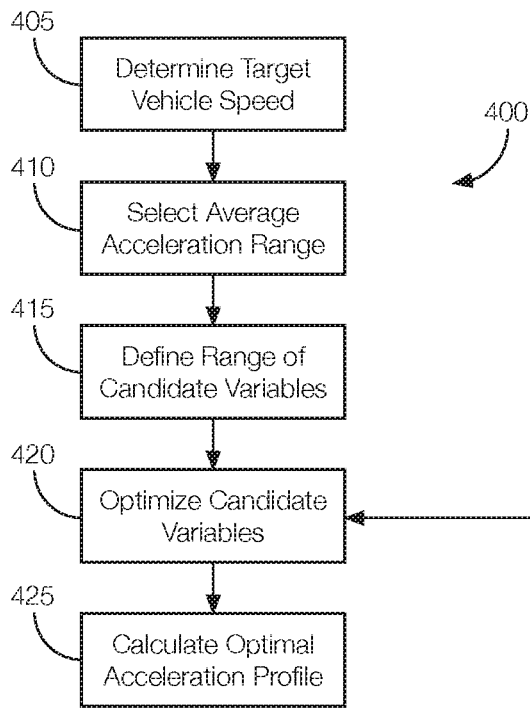
FIG. 4 is a flowchart of an example process that may be executed by the autonomous vehicle controller to apply the optimized acceleration profile.

FIG. 4 is a flowchart of an example process 400 that may be executed by the autonomous vehicle controller 105 to control the acceleration of the host vehicle 100 according to the optimized acceleration profile. The process 400 may begin at any time the autonomous vehicle controller 105 determines that the host vehicle 100 needs to accelerate.

At block 405, the autonomous vehicle controller 105 determines the target vehicle speed, $V_{target}$. The processor 125 may be programmed to determine the target vehicle speed based on data stored in the memory 120 or determined during real-time path planning, as discussed above. In some instances, the processor 125 may be programmed to determine the target vehicle speed as part of autonomously controlling the host vehicle 100. That is, the processor 125 may be programmed to determine the target vehicle speed based on factors such as the present vehicle speed, the route taken by the host vehicle 100, other vehicles and objects near the host vehicle 100, etc.

At block 410, the autonomous vehicle controller 105 selects a range of the average acceleration. The processor 125 may be programmed to select the range of the average acceleration based on various factors such as a road safety condition, that is processor 125 may be programmed to select the minimum and maximum average accelerations. The processor 125 may be programmed to select the peak acceleration as well. The peak acceleration may be based on the powertrain capability of the host vehicle 100.

At block 415, the autonomous vehicle controller 105 defines ranges of the candidate variables ($a_1$, $t_1$, $t_2$, and h). The processor 125 may be programmed to define the ranges of the candidate variables based on various constraints including the constraints reflected by Equations (3)-(6).

At block 420, the autonomous vehicle controller 105 optimizes the candidate variables. For instance, the processor 125 may be programmed to determine the energy cost function of each combination of candidate variables. Further, the processor 125 may be programmed to select the candidate combination resulting in the minimum energy cost function. More on how the processor 125 is programmed to do that is discussed below with respect to FIG. 5. In short, the processor 125 is programmed to determine multiple cost functions, each associated with a different combination of candidate variables ($a_1$, $t_1$, $t_2$, and h). The processor 125 is further programmed to select one of the energy cost functions as the minimum energy cost function and determine which combination of candidate variables is associated with the minimum energy cost function. Then, as explained below with respect to block 425, the processor 125 is programmed to control the acceleration of the host vehicle 100 according to the combination of candidate variables associated with the minimum energy cost function.

At block 425, the autonomous vehicle controller 105 calculates the acceleration profile curves based on the results of block 420. For instance, using the optimized candidate variables for $a_1$, $t_1$, $t_2$, and h determined at block 420, the processor 125 may be programmed to solve for Acc in Equation (1) and (2) for the first and second time periods, respectively. In doing so the processor 125 may be programmed to define the parabolic curves representing the accelerations during each of those time periods. The processor 125 may be programmed to control the electric motor or the propulsion actuator 115 according to the results of solving Equations (1) and (2). As such, the processor 125 is programmed to control acceleration of the host vehicle 100 according to the optimized acceleration profile.

Figure 5:
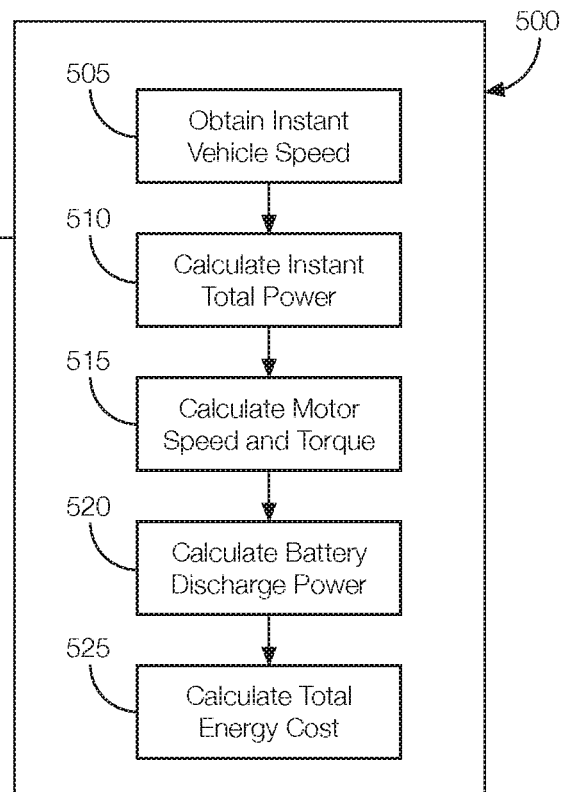
FIG. 5 is a flowchart of an example process that may be executed by the autonomous vehicle controller to determine the optimized acceleration profile.

FIG. 5 is a flowchart of an example process 500 that may be executed by the autonomous vehicle controller 105 to optimize the candidate variables ($a_1$, $t_1$, $t_2$, and h). The process 500 may occur at block 420 of the process 400 discussed above with respect to FIG. 4.

At block 505, the autonomous vehicle controller 105 obtains the instant vehicle speed, V(t). The processor 125 may be programmed to obtain the instant vehicle speed for each acceleration candidate profile until the vehicle speed reaches the target vehicle speed, $V_{target}$.

At block 510, the autonomous vehicle controller 105 calculates the instant total power. The processor 125 may be programmed to calculate the instant total power based on estimated driver demand power and accessory power. In some instances, the processor 125 may obtain the estimated driver demand power from the instant vehicle speed.

At block 515, the autonomous vehicle controller 105 calculates the instant electric motor speed and torque. The processor 125 may be programmed to calculate the instant electric motor speed and torque. The electric motor speed may be a function of the instant vehicle speed determined at block 505. The torque may be a function of the instant total power determined at block 510 and the motor speed. Specifically, the processor 125 may be programmed to calculate the torque by dividing the instant total power determined at block 510 by the motor speed.

At block 520, the autonomous vehicle controller 105 calculates the battery discharge power. The processor 125 may be programmed to calculate the battery discharge power based on the instant total power determined at block 510, the efficiency of the electric motor, and the efficiency of the propulsion battery 110. The efficiency of the electric motor may be a function of the motor speed and motor torque determined at block 515. The efficiency of the propulsion battery 110 may be a function of the battery state of charge and the instant total power determined at block 515.

At block 525, the autonomous vehicle controller 105 calculates the total energy cost given the combination of candidate variables. The processor 125 may be programmed to calculate the total energy cost as a summation of the battery discharge power determined at block 520 for each time increment during the first time period and second time period (e.g., from time 0 to $t_2$).

The process 500 may be repeated for different combinations of candidate variables ($a_1$, $t_1$, $t_2$, and h). The result of each iteration of the process 500 may be provided to block 420 so that the combination of candidate variables with the lowest energy cost can be selected and the optimized acceleration profile can be generated based on that combination of candidate variables.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An autonomous vehicle controller comprising:
a memory; and
a processor programmed to execute instructions stored in the memory, the instructions including:
determining a plurality of energy cost functions, each associated with a combination of candidate variables,
wherein each combination of candidate variables defines one of a plurality of acceleration profiles, each acceleration profile specifying a respective change in acceleration for a first and a second time period, and
wherein acceleration in each of the acceleration profiles is constrained by a target vehicle speed, a maximum average acceleration from a beginning of the first time period to an end of the second time period, and a minimum average acceleration from the beginning of the first time period to the end of the second time period;
selecting one of the plurality of energy cost functions as a minimum energy cost function,
determining a combination of candidate variables associated with the minimum energy cost function and then selecting the combination of candidate variables associated with the minimum energy cost function as an optimized acceleration profile, and
controlling acceleration of a host vehicle according to the combination of candidate variables associated with the minimum energy cost function.

2. The autonomous vehicle controller of claim 1, wherein determining a total energy cost for each combination of candidate variables includes calculating a battery discharge power.

3. The autonomous vehicle controller of claim 2, wherein calculating the battery discharge power includes calculating the battery discharge power based at least in part on an instant total power, an electric motor efficiency, and a propulsion battery efficiency.

4. The autonomous vehicle controller of claim 3, wherein the processor is programmed to calculate the electric motor efficiency based at least in part on a motor speed and a motor torque.

5. The autonomous vehicle controller of claim 4, wherein the processor is programmed to calculate the motor speed as a function of an instant vehicle speed and wherein the processor is programmed to calculate the motor torque as a function of the instant total power.

6. The autonomous vehicle controller of claim 3, wherein the processor is programmed to calculate the propulsion battery efficiency based at least in part on a state of charge of a propulsion battery and the instant total power.

7. The autonomous vehicle controller of claim 3, wherein the processor is programmed to calculate the instant total power based at least in part on an estimated driver demand and an estimated accessory power.

8. The autonomous vehicle controller of claim 1, wherein controlling acceleration of the host vehicle according to the combination of candidate variables associated with the minimum energy cost function includes controlling acceleration of the host vehicle according to the optimized acceleration profile.

9. A method comprising:
   determining a plurality of energy cost functions, each associated with a combination of candidate variables;
      wherein each combination of candidate variables defines one of a plurality of acceleration profiles, each acceleration profile specifying a respective change in acceleration for a first and a second time period, and
      wherein acceleration in each of the acceleration profiles is constrained by a target vehicle speed, a maximum average acceleration from a beginning of the first time period to an end of the second time period, and a minimum average acceleration from the beginning of the first time period to the end of the second time period;
   selecting one of the plurality of energy cost functions as a minimum energy cost function;
   determining a combination of candidate variables associated with the minimum energy cost function and then selecting the combination of candidate variables associated with the minimum energy cost function as an optimized acceleration profile; and
   controlling acceleration of a host vehicle according to the combination of candidate variables associated with the minimum energy cost function.

10. The method of claim 9, wherein determining a total energy cost for each combination of candidate variables includes calculating a battery discharge power based at least in part on an instant total power, an electric motor efficiency, and a propulsion battery efficiency.

11. The method of claim 10, wherein the electric motor efficiency is calculated based at least in part on a motor speed and a motor torque.

12. The method of claim 11, wherein the motor speed is a function of an instant vehicle speed and wherein the motor torque is a function of the instant total power.

13. The method of claim 10, wherein the propulsion battery efficiency is calculated based at least in part on a state of charge of a propulsion battery and the instant total power.

14. The method of claim 10, wherein the instant total power is calculated based at least in part on an estimated driver demand and an estimated accessory power.

* * * * *